Patented Feb. 9, 1926.

1,572,117

UNITED STATES PATENT OFFICE.

OTTO HERMANN, OF CHICAGO, ILLINOIS, ASSIGNOR TO THERMO ELECTRIC BATTERY COMPANY, OF CHICAGO, ILLINOIS, A CORPORATION OF ILLINOIS.

THERMOELECTRIC ELEMENT.

No Drawing.  Application filed May 4, 1925. Serial No. 28,034.

*To all whom it may concern:*

Be it known that I, OTTO HERMANN, a citizen of the United States, and a resident of Chicago, in the county of Cook and State of Illinois, have invented a new and useful Improvement in Thermoelectric Elements, of which the following is a full, clear, and exact description.

My invention relates to improvements in thermo-electric elements for thermo-couples, and it consists in an alloy composed of certain metals in definite proportions.

An object of my invention is to provide a negative element of a thermo-couple which produces a relatively high electro-motive force when it is joined in a well known manner to a positive element to form a thermo-couple. In designating this alloy as a negative element of the thermo-couple, it will be understood that the current flows over the hot junction from the positive element to this novel negative element, and back to the positive element through the external circuit.

A further object of my invention is to provide a negative element of a thermo-couple, having a low temperature coefficient, (that is, a small increase of ohmic resistance per degree rise in temperature) and a relatively small thermal conductivity, while the electrical conductivity of the element is relatively high.

Other objects and advantages will appear in the following specification, and the novel features of the invention will be particularly pointed out in the appended claim.

In carrying out my invention, I make use of an alloy composed of 81% of nickel, 17% of molybdenum, and 2% of vanadium.

A thermo-couple formed from this alloy as the negative element and Constantan, an alloy composed of 40% of nickel and 60% of copper as the positive element, consumes a relatively small quantity of heat for a given quantity of electrical energy produced. This fact has been found to be due to the high electro-motive force obtained with this thermo-couple, together with the low temperature coefficient and the relatively small ohmic resistance and thermal-conductance of both of the thermo-elements.

Besides having a low temperature coefficient and a fairly small ohmic resistance compared with its thermal-conductance, the ductility of the nickel alloy permits it to be forged, drawn into wire or ribbon, and rolled into sheet form. It has considerable tensile strength and resists oxidation at higher temperatures.

I have found that other nickel-molybdenum-vanadium alloys varying in composition only slightly from the composition herein disclosed, have a smaller electrical potential and electrical conductivity, and also an increased temperature coefficient and thermal conductivity, and therefore do not possess the properties which my improved thermo-element does possess.

I claim:

A thermo-electric element consisting of an alloy composed of substantially 81% of nickel, 17% of molybdenum, and 2% of vanadium.

OTTO HERMANN.